(12) United States Patent
Schleyer

(10) Patent No.: US 11,756,192 B2
(45) Date of Patent: Sep. 12, 2023

(54) PET ATTENUATION MAP ALIGNMENT

(71) Applicant: Siemens Medical Solutions USA, Inc., Malvern, PA (US)

(72) Inventor: Paul Schleyer, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 406 days.

(21) Appl. No.: 17/247,443

(22) Filed: Dec. 11, 2020

(65) Prior Publication Data

US 2021/0312617 A1    Oct. 7, 2021

Related U.S. Application Data

(60) Provisional application No. 63/003,422, filed on Apr. 1, 2020.

(51) Int. Cl.
*G06T 7/00* (2017.01)
*G06T 5/50* (2006.01)

(52) U.S. Cl.
CPC .............. *G06T 7/0012* (2013.01); *G06T 5/50* (2013.01); *G06T 2207/10104* (2013.01)

(58) Field of Classification Search
CPC ......... G06T 7/0012; G06T 2207/10104; G06T 2207/10088; G06T 2207/30004; G06T 5/50; G06T 5/008; G06T 2207/10108; G06T 2207/20081; G06T 2207/20084; A61B 6/481; A61B 6/486; A61B 6/5205; A61B 6/5217; A61B 6/037
See application file for complete search history.

(56) References Cited

U.S. PATENT DOCUMENTS

| | | | |
|---|---|---|---|
| 2014/0079304 A1* | 3/2014 | Foo | G06T 7/11 382/131 |
| 2018/0300907 A1* | 10/2018 | Ding | G06T 11/006 |
| 2020/0320753 A1* | 10/2020 | Feng | A61B 5/7267 |

* cited by examiner

*Primary Examiner* — Siamak Harandi

(57) ABSTRACT

Systems and methods include acquisition of magnetic resonance data of a subject disposed in a first position, acquisition of positron emission tomography data of imaging hardware and of the subject disposed substantially in the first position, generation of a subject attenuation correction map of the subject based on the magnetic resonance data, determination of an imaging hardware attenuation correction map associated with the imaging hardware, determination of a target location and orientation of the imaging hardware attenuation correction map with respect to the positron emission tomography data and based on the positron emission tomography data and on the subject attenuation correction map, and application of attenuation correction to the positron emission tomography data based on the imaging hardware attenuation correction map in the target location and orientation and the subject attenuation correction map to generate attenuation-corrected positron emission tomography data.

20 Claims, 11 Drawing Sheets

PET ATTENUATION MAP ALIGNMENT

CROSS-REFERENCE TO RELATED APPLICATIONS

The present application claims benefit of and priority to U.S. Provisional Patent Application Ser. No. 63/003,422, filed Apr. 1, 2020, for all purposes.

BACKGROUND

According to conventional positron-emission-tomography (PET) imaging, a radiopharmaceutical tracer is introduced into a patient body. Radioactive decay of the tracer generates positrons which eventually encounter electrons and are annihilated thereby. This annihilation produces two photons which travel in approximately opposite directions. A ring of detectors surrounding the body detects the emitted photons and identifies "coincidences" in which two detectors disposed on opposite sides of the body detect the arrival of two photons within a particular coincidence time window. A PET image is then reconstructed based on PET data describing the identified coincidences.

Each photon detected by a detector travels through the patient body and through any other objects located along the path between the annihilation and the detector. These intervening objects attenuate the photons based on their respective electron densities. Accordingly, the PET data is typically corrected to account for this attenuation prior to or while reconstructing a PET image therefrom. This correction may be performed using an attenuation correction map which models the electron densities of the intervening objects.

In PET/computed tomography (CT) imaging, a CT image of the patient body and intervening objects is acquired and is used to generate a corresponding attenuation correction map. Next, PET data is acquired while the patient body remains in a same position. The PET data is corrected using the attenuation map and a PET image is reconstructed based on the corrected PET data. Such an approach is not suitable for PET/magnetic resonance (MR) imaging because MR imaging does not measure electron density but rather relies on the existence of protons within an object to be imaged. Typical clinical MR imaging would therefore not receive signals from hardware objects such as the patient table and MR transmit/receive coils which are located in the PET field of view and which contribute to photon attenuation. Accordingly, MR imaging cannot be used to generate a suitable attenuation correction map corresponding to the intervening hardware objects.

According to some systems, an attenuation correction map for a hardware object may be pre-generated (e.g., at manufacturing time) using a CT scan as described above. The attenuation correction map may then be used to correct PET data acquired by a PET/MR system in which the hardware object is deployed. This correction typically assumes a particular spatial location and orientation of the hardware object with respect to the PET imaging system. For example, a head/neck coil may be assumed to be in a specific position by virtue of its attachment to corresponding attachment points of a patient table. However, any discrepancies between the actual spatial location and orientation of the hardware object and the assumed position may reduce the quality of PET images reconstructed from the corrected PET data.

Some PET/MR systems use hardware objects, such as body coils, whose position may be varied by the system operator such that a fixed or known location of these objects cannot be assumed. Conventionally, these hardware objects are therefore ignored during attenuation correction of the PET data. Failing to account for these hardware objects may cause significant error in PET images reconstructed from thusly-corrected PET data.

Systems for improved attenuation correction of PET images acquired by a PET/MR system are desired.

DETAILED DESCRIPTION

The following description is provided to enable any person in the art to make and use the described embodiments. Various modifications, however, will remain apparent to those in the art.

Generally, some embodiments provide improved attenuation correction of PET data acquired by a PET/MR imaging system. Improved attenuation correction may be achieved by facilitating registration between attenuation correction maps associated with various hardware objects and PET data attenuated by the hardware objects. Such registration may be particularly useful in PET/MR imaging since, unlike the CT imaging system of a PET/CT system, attenuation correction maps of the hardware objects cannot be derived based on data acquired by an MR imaging system using typical clinical acquisition protocols. The terms "attenuation correction map" and "attenuation map" will be used interchangeably herein.

Some embodiments utilize one or more attenuation correction maps of hardware objects which are located in the field of view (e.g., an MR head/neck coil, an MR body coil) during PET imaging. Such an attenuation correction map may be generated based on intrinsic knowledge of the objects, or based on any combination of CT or transmission PET imaging of the objects as is known in the art.

An attenuation correction map of a subject to be imaged (e.g., a patient) is also acquired. For example, an MR imaging system of a PET/MR system may acquire MR images of a patient who is to be subsequently imaged by a PET imaging system of the PET/MR system. The MR images are segmented and fixed attenuation coefficients are assigned to the various segments to generate an attenuation correction map of the patient as is known in the art. Other techniques for generating an attenuation correction map of the patient include the use of trained models to directly convert an MR image to a pseudo-CT image, PET data is acquired before, during or after acquisition of the MR images, the attenuation correction maps are registered to the PET data if needed, and a PET image is reconstructed based on the PET data and the registered attenuation correction maps. In some embodiments, a trained model is used to generate the attenuation correction map of the patient directly from a non-attenuation corrected PET image generated based on the acquired PET data.

According to some embodiments, the attenuation correction maps are registered to the PET data by determining a location and orientation (and, in some aspects, spatial deformation) that optimizes the consistency of attenuation-corrected detected coincidences at a number of selected coordinates. Consistency refers to a condition in which, for a given spatial point in the activity distribution within the PET field of view and assuming no scatter or randoms, the attenuation-corrected coincidence count rate measured at all view angles is equal.

Figure 1:
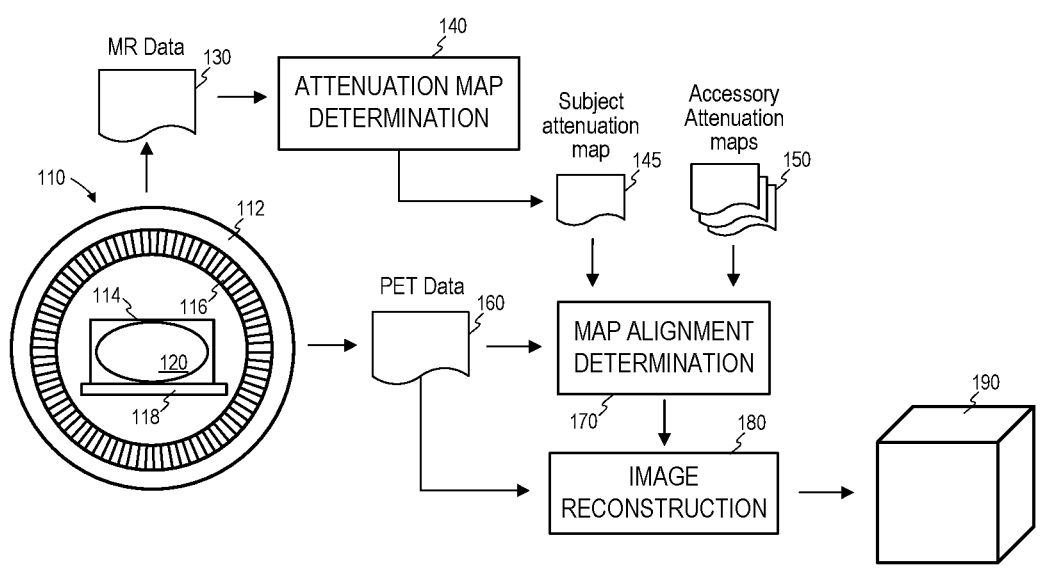
FIG. 1 is a functional block diagram of a system to attenuation-correct PET data according to some embodiments.

FIG. 1 is a functional block diagram of system to attenuation-correct PET data according to some embodiments. FIG. 1 includes an axial view of PET/MR imaging system 110, which may generate MR images and PET images of imaging subject 120 disposed therein as is known in the art. Imaging subject 120 may comprise a human body, a phantom, or any other suitable subject.

PET/MR imaging system 110 includes housing 112 comprising MR imaging components (not shown). The MR imaging components may operate in conjunction with one or more MR imaging hardware accessories 114 disposed within a bore of housing 112 and adjacent to subject 120 to generate and acquire MR signals from which an MR image of subject 120 may be generated. Housing 112 also includes PET detector ring 116 and other components required to generate PET data from which a PET image may be reconstructed. Detector ring 116 may be composed of any number of (e.g., eight) adjacent and coaxial rings of detectors.

PET/MR system 110 also includes table 118 on which subject 120 rests during imaging. As described above, photons emitted from subject 120 during PET imaging may be attenuated by MR imaging hardware accessories 114 and table 118 prior to detection by PET detector ring 116. It would therefore be beneficial to correct the resulting PET data using one or more attenuation correction maps representing MR imaging hardware accessories 114 and table 118 and aligned with the PET imaging components. However, since MR imaging hardware accessories 114 and table 118 are substantially invisible to the MR imaging components of system 110, such attenuation correction maps cannot be generated from MR signals acquired by the MR imaging components while subject 120 is disposed in the desired PET imaging position.

The photons emitted from within subject 120 are also attenuated by subject 120 prior to reaching detector ring 116. Accordingly, as shown in FIG. 1, some embodiments operate to acquire MR data 130 representing subject 120 and to generate subject attenuation map 145 based on MR data 130. Attenuation map determination component 140 may generate subject attenuation map 145 based on MR data 130 as is known in the art.

FIG. 1 also shows accessory attenuation maps 150 representing one or more hardware accessories located within the PET field of view of PET/MR system 110. For example, one of accessory attenuation maps 150 may comprise an attenuation correction map of table 118, and one of accessory attenuation maps 150 may comprise an attenuation correction map of an MR head/neck coil surrounding appropriate portions of subject 120. One or more of accessory attenuation maps 150 may be pre-generated by acquiring CT data of the corresponding hardware accessory and determining an attenuation correction map from the acquired CT data. Accessory attenuation maps 150 may be generated by any suitable process that is or becomes known.

The PET imaging components of PET/MR system 110 also operate to generate PET data 170 based on photons emitted from within subject 120 as is known in the art. Generally, each PET detector of detector ring 116 includes one or more scintillation elements and one or more electrical transducers. In response to receiving the 511 keV photons which result from annihilation events within subject 120, the scintillation elements generate photons having an energy of a few electron volts (eV). The electrical transducers convert the low-energy photons created by the scintillation elements to electrical signals. According to some embodiments, the electrical transducers may comprise, for example, SiPMs, PMTs, or semiconductor-based detectors.

A coincidence is detected when any pair of detectors within ring 116 receive two gamma photons within a coincidence time window, as determined based on the calculated arrival times of the two gamma photons at their respective detectors. Because the two "coincident" photons travel in approximately opposite directions, the locations of the two detectors determine an LOR along which an annihilation event may have occurred.

PET data 160 may comprise a sinogram which stores all coincidences detected over a period of time, or frame. A sinogram is a data array of the angle and the displacement of each LOR of each detected coincidence. A sinogram includes one row containing the LOR for a particular azimuthal angle φ. Each of these rows corresponds to a one-dimensional parallel projection of the tracer distribution at a different coordinate. A sinogram stores the location of the LOR of each coincidence such that all the LORs passing through a single point in the volume trace a sinusoid curve in the sinogram.

A sinogram may represents each coincidence by its LOR, energy level, the time at which the coincidence occurred, and other information. According to ToF PET imaging, the sinogram also associates each coincidence with a ToF bin representing the difference between the arrival times of the two photons whose detection resulted in the detected coincidence. This ToF bin of a coincidence may be used to more accurately estimate a particular position along the LOR at which the corresponding annihilation event occurred.

According to some embodiments, PET data 160 is in listmode format. In listmode format, each detected coincidence is represented by information describing the two detectors which recorded the coincidence (which also define the LOR), the corresponding ToF value (e.g., as a ToF bin), the time at which the coincidence occurred, and other information.

A "true" coincidence represents the detection of two coincident photons which arose from a single annihilation event located on a LOR between the two detectors. A "random" coincidence represents two coincident photons which did not arise from the same annihilation event. A "scatter" coincidence is a type of true coincidence in which two coincident photons originated from the same annihilation event but the annihilation event was not located along the LOR of the two detectors because one or both of the photons interacted and scattered within the body or with other material.

Conventional PET scanners detect all coincidences without regard to whether the coincidences are true, random or scatter coincidences. Since only the true coincidences represent spatial information regarding the distribution of the tracer within the body, random coincidences and scatter coincidences are often subtracted from or otherwise used to correct acquired PET data before or during reconstruction of a PET image. Software and/or hardware-based approaches can be used to estimate random coincidences and to subtract the random coincidences from the detected coincidences to result in PET data 160.

Map alignment determination component 170 receives subject attenuation map 145, accessory attenuation maps 150 and PET data 160. Map alignment determination component 170 operates to determine an alignment (and/or distortion) of each of accessory attenuation maps 150 with respect to PET data 160. According to some embodiments, the determined alignment is intended to result in more accurate attenuation correction of PET data 160 than current techniques. Determination of the alignment and/or distortion may comprise determination of an alignment and/or distortion of accessory attenuation maps 150 which, when used to attenuation-correct PET data 160, maximizes a consistency of thusly-corrected PET data 160.

In this regard, image reconstruction component 180 receives PET data 160, aligned accessory attenuation maps 150 and subject attenuation map 140, and reconstructs PET image 190 based thereon. Image reconstruction component 180 may employ any reconstruction algorithm that is or becomes known. Such a reconstruction algorithm may correct PET data 160 for random and scatter coincidences, and based on the received attenuation maps, prior to or during reconstruction.

Each of the components of FIG. 1 may be implemented using any combination of hardware and/or software that is or becomes known. One or more components may share hardware and/or software elements. According to some embodiments, each component is implemented in software and executed by one or more software-executing processing units of a PET/MR imaging system. Functions implemented by one or more components may be executed remotely from the execution of other functions, for example by a cloud-based service.

Figure 2:
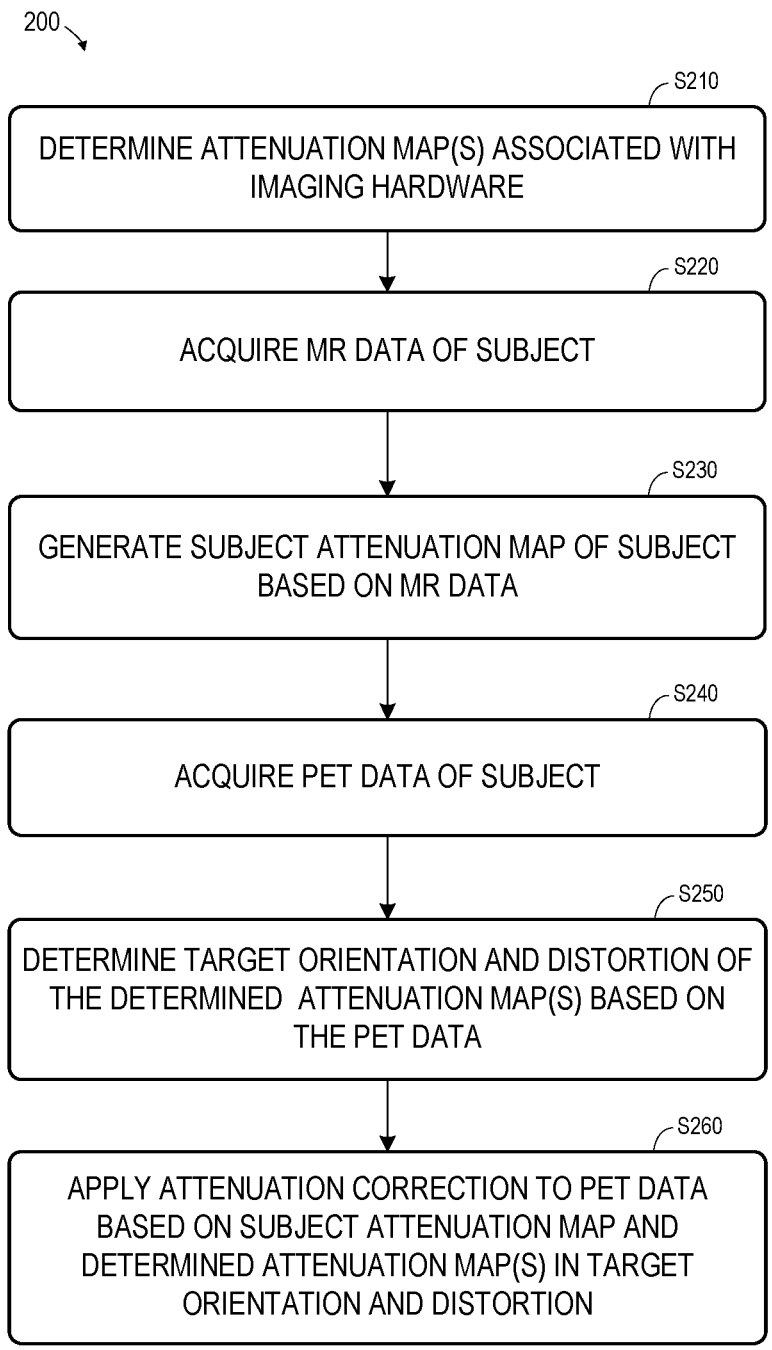
FIG. 2 is a flow diagram of a process to attenuation-correct PET data according to some embodiments.

FIG. 2 is a flow diagram of process 200 to perform attenuation correction on coincidence data according to some embodiments. Process 200 and other processes described herein may be executed using any suitable combination of hardware and software. Software program code embodying these processes may be stored by any non-transitory tangible medium, including a fixed disk, a volatile or non-volatile random-access memory, a DVD, a Flash drive, and a magnetic tape, and executed by any suitable processing unit, including but not limited to one or more microprocessors, microcontrollers, processing cores, and processor threads. Embodiments are not limited to the examples described below.

Initially, at S210, one or more attenuation maps associated with imaging hardware are determined. The determined attenuation maps are those which will be in the field of view during subsequent acquisition of PET data. For example, it may be desired to operate a PET/MR imaging system to perform MR imaging and PET imaging of a patient while the patient is disposed in a same position within a bore of the PET/MR imaging system. Since imaging hardware to be used during the MR imaging and disposed within the bore may attenuate emitted photons during the PET imaging, attenuation correction maps of this imaging hardware are required.

The imaging hardware may include rigid and/or non-rigid hardware. Examples of rigid hardware include an MR head/neck coil and an MR head coil, while non-rigid hardware may include an MR flexible body coil, for example. An MR coil may receive RF signals emitted due to proton relaxation during an MR sequence. Accordingly, signal-to-noise ratios may be improved by locating the MR coil close to the regions to be imaged. Imaging hardware for which an attenuation correction map is determined at S210 may also include hardware which is not dedicated solely to MR imaging, such as a patient table.

Attenuation correction map may be determined at S210 based on intrinsic knowledge of the imaging hardware, or based on any combination of CT or transmission PET imaging of the objects as is known in the art. In some embodiments, a CT scan of imaging hardware is performed well before execution of process 200 (e.g., at a manufacturer or other location remote from the imaging theatre) and an attenuation correction map of the imaging hardware is generated based on the CT scan as is known in the art.

The hardware may be placed within the field of view of the CT scan in an expected usage position. For example, an MR head/neck coil to be scanned may be attached to a table and positioned with respect to the CT scanner in a same manner as it would be positioned during PET imaging within a PET/MR system.

Imaging hardware which may be used in several common positions and/or orientations may be subjected to a separate CT scan in each position/orientation combination, with an attenuation correction map being generated for each separate CT scan. In this regard, non-rigid imaging hardware may be scanned in several different distortions (e.g., a body coil lying flat on a table, wrapped around a phantom, etc.), and an attenuation correction map may be generated for each separate distortion.

The pre-acquired attenuation correction maps may be downloaded to the PET/MR imaging system prior to process 200. S210 therefore consists of identifying an attenuation correction map for each imaging hardware which will be used. In a case that more than one attenuation correction map is available for a given imaging hardware, S210 may include selection of an attenuation correction map which corresponds most closely to a position/orientation/distortion in which the imaging hardware will be disposed during subsequent PET imaging.

MR data of a subject to be imaged is acquired at S220. For example, a subject (e.g., a patient) is placed into a bore of a PET/MR imaging system along with the imaging hardware for which the one or more attenuation maps were determined at S210, and an MR imaging sequence is executed to acquire MR data as is known in the art. The MR imaging sequence may be selected to produce MR data which is suitable for generation of an attenuation correction map therefrom.

Figure 3:
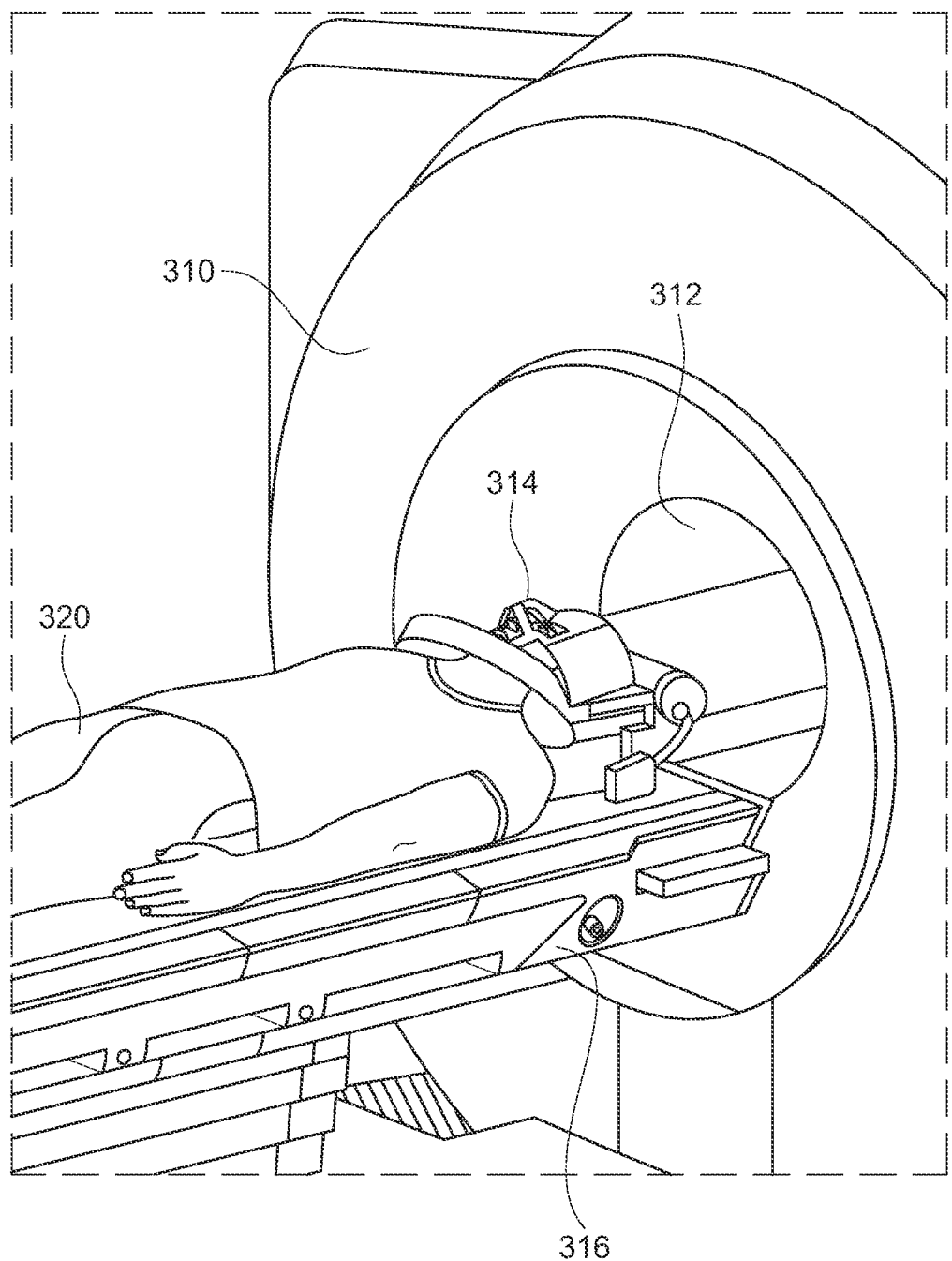
FIG. 3 is a view of a PET/MR system prior to scanning a patient and a head/neck coil according to some embodiments.

FIG. 3 illustrates subject 320 and MR head/neck coil 314 prior to being placed into bore 312 of PET/MR system housing 310 at S220. It should be noted that table 316 will also be placed into bore 312 during acquisition of the MR data at S220. Accordingly, in this example, S210 included determination of an attenuation correction map associated with MR head/neck coil 314 and an attenuation correction map associated with table 316.

Figure 4:
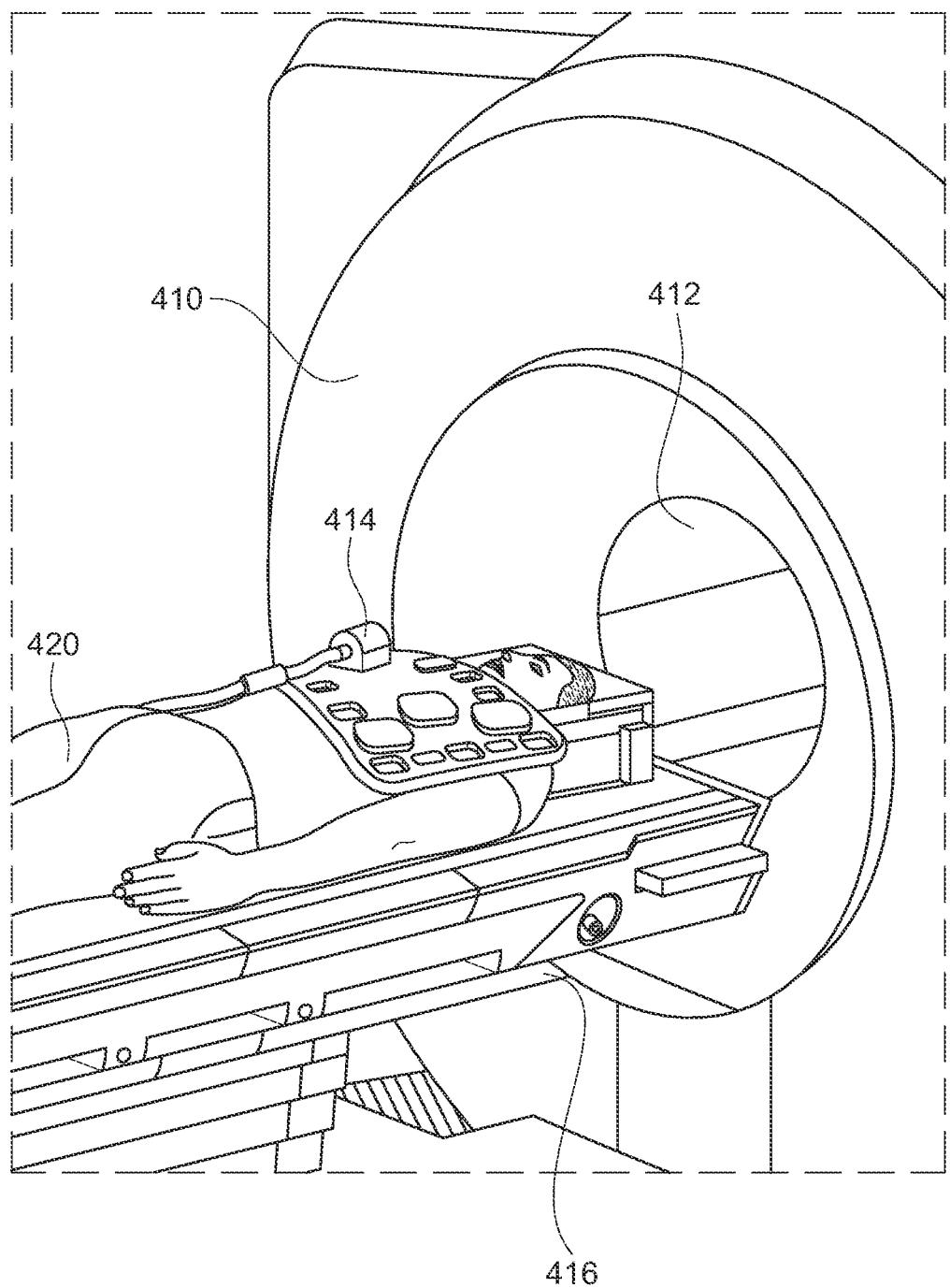
FIG. 4 is a view of a PET/MR system prior to scanning a patient and a body coil according to some embodiments.

FIG. 4 illustrates subject 420 and MR body coil 414 prior to being placed into bore 412 of PET/MR system housing 410 at S220. In this example, S210 included determination of an attenuation correction map associated with MR body coil 414 and an attenuation correction map associated with table 416. Embodiments may be applicable to any combination of imaging hardware.

A subject attenuation map is generated based on the MR data at S230. As mentioned above, S230 may comprise segmentation of the MR data and assignment of fixed attenuation coefficients to the various segments to generate an attenuation correction map of the subject as is known in the art.

PET data of the subject is acquired at S240. According to some embodiments, and while the subject remains in substantially the same position as during S220, a radionuclide tracer is injected into the subject and PET imaging components detect resulting coincidences. Data corresponding to the coincidences are stored in a sinogram or listmode file as described above. A ToF value may also be included for each coincidence representing a difference in the reception time of the photon detection events of the coincidence.

Next, at S250, a target orientation and distortion of each attenuation map determined at S210 is determined based on the PET data. To simplify the foregoing description, an orientation will hereinafter refer to a particular x-y-z position and yaw-pitch-roll orientation. Generally, target orientations and distortions are determined which maximize the consistency of attenuation-corrected detected coincidences. A target orientation and distortion of each attenuation map is therefore determined at S250 such that, if the acquired PET data was attenuation-corrected using the subject attenuation correction map and the determined attenuation correction maps in the target orientation and distortion, the resulting PET data would exhibit an approximately equal coincidence count rate from all view angles for any given point in the activity distribution in the PET field of view.

Figure 5:
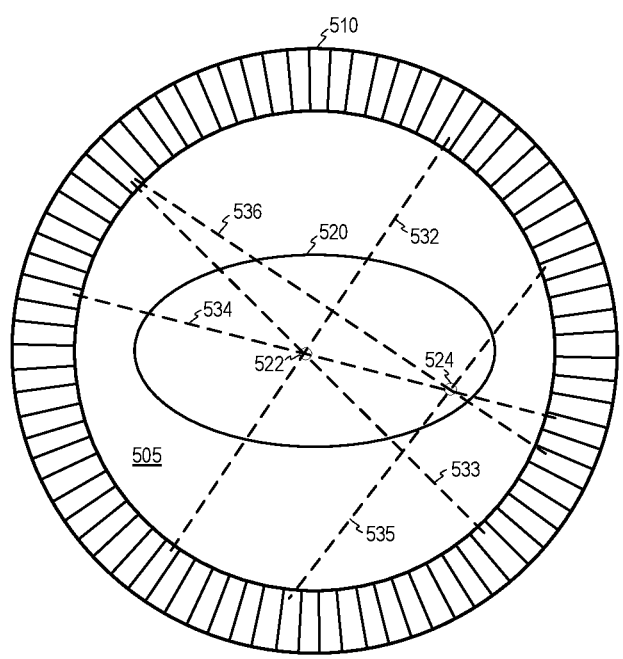
FIG. 5 is a view of LORs and associated annihilation event locations within a PET detector ring according to some embodiments.

FIG. 5 is a diagram of PET detector ring 510 and subject 520 for the purpose of describing consistency evaluations according to some embodiments. It will be assumed that detector ring 510 is used at S240 to acquire PET data based on photon emissions from within subject 520. As described above, the acquired PET data associates each coincidence detected by detector ring 510 during a given time frame with a line of response and a ToF bin.

In order to evaluate consistency at a given point, all coincidences associated with each LOR passing through the point (e.g., LORs 532, 533 and 534 passing through point 522) and, if available, spatially localized with ToF, are identified. If the difference in the number of attenuation-corrected identified coincidences associated with each LOR over the acquisition period are minimized, the PET data is considered consistent with respect to the given point. The evaluation may be repeated for other points throughout subject 520 (e.g., for LORs 534, 535 and 536 passing through point 524) to estimate whether the entire set of PET data is consistent. PET data may include many more LORs passing through each evaluated point than depicted in FIG. 5, and the LORs and evaluated points are not limited to a single two-dimensional plane as shown.

Attenuation correction is applied to the PET data at S260 based on the subject attenuation map generated at S230 and the attenuation correction map(s) determined at S210. The attenuation correction assumes that the attenuation correction map(s) determined at S210 are oriented and distorted according to the target orientation and distortion determined at S250. Such attenuation correction therefore results in substantially-consistent PET data. The attenuation correction may be applied within an image reconstruction process, such that the output of S260 is a reconstructed and attenuation-corrected PET image.

Figure 6:
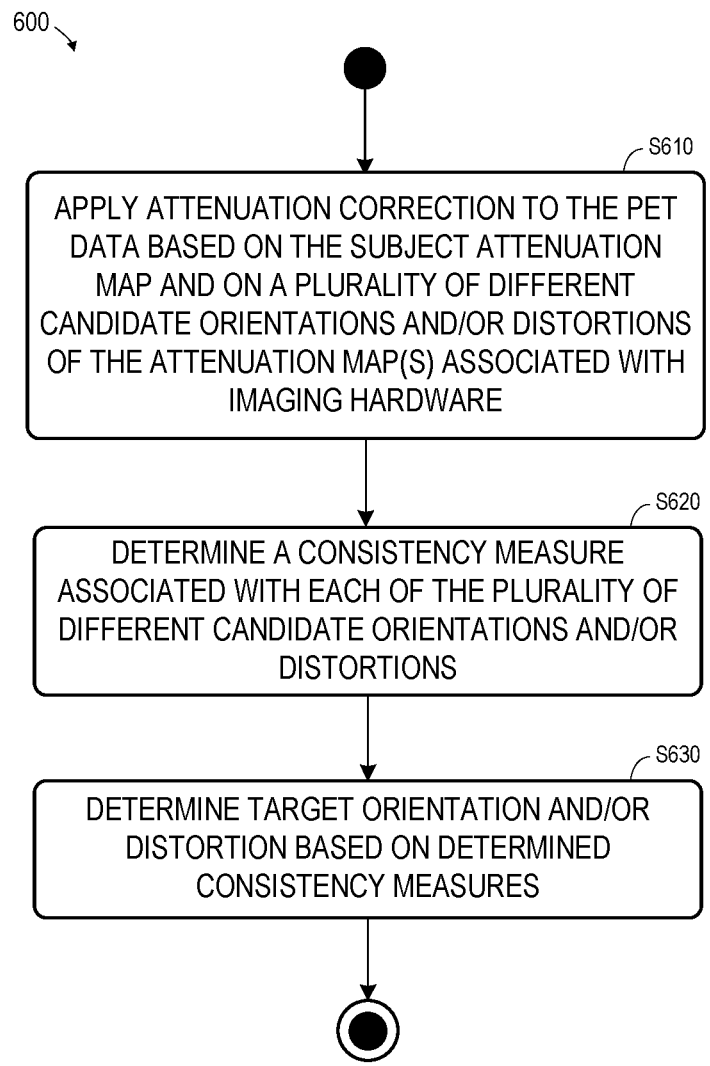
FIG. 6 is a flow diagram of a process to determine a target orientation of attenuation maps according to some embodiments.

FIG. 6 is a flow diagram of process 600 to determine a target orientation and distortion at S250 according to some embodiments. At S610, attenuation correction is applied a plurality of times to the PET data using the subject attenuation map and the attenuation map(s) associated with the imaging hardware. Each iteration of attenuation correction is based on a different candidate orientation and/or distortion of one or more of the attenuation map(s). S610 therefore generates a plurality of sets of attenuation-corrected PET data, with each set associated with a particular candidate orientation and/or distortion of the attenuation map(s).

A consistency measure is determined at S620 for each of the plurality of sets of attenuation-corrected PET data. The consistency measure determined for a set of attenuation-corrected PET data is therefore associated with the particular candidate orientation and/or distortion of the attenuation map(s) with which the set of attenuation-corrected PET data is associated. The consistency measure may be determined in any suitable manner. For example, a consistency measure may be determined by evaluating the consistency at several point with the PET data and generating an error value based on the evaluations.

A target orientation and/or distortion is determined at S630 based on the determined consistency measures. For example, a set of attenuation-corrected PET data having a most favorable consistency measure (e.g., lowest error) is identified, and the particular attenuation map orientation and/or distortion which is associated with the identified set of PET data is determined to be the target orientation and/or distortion.

Figure 7:
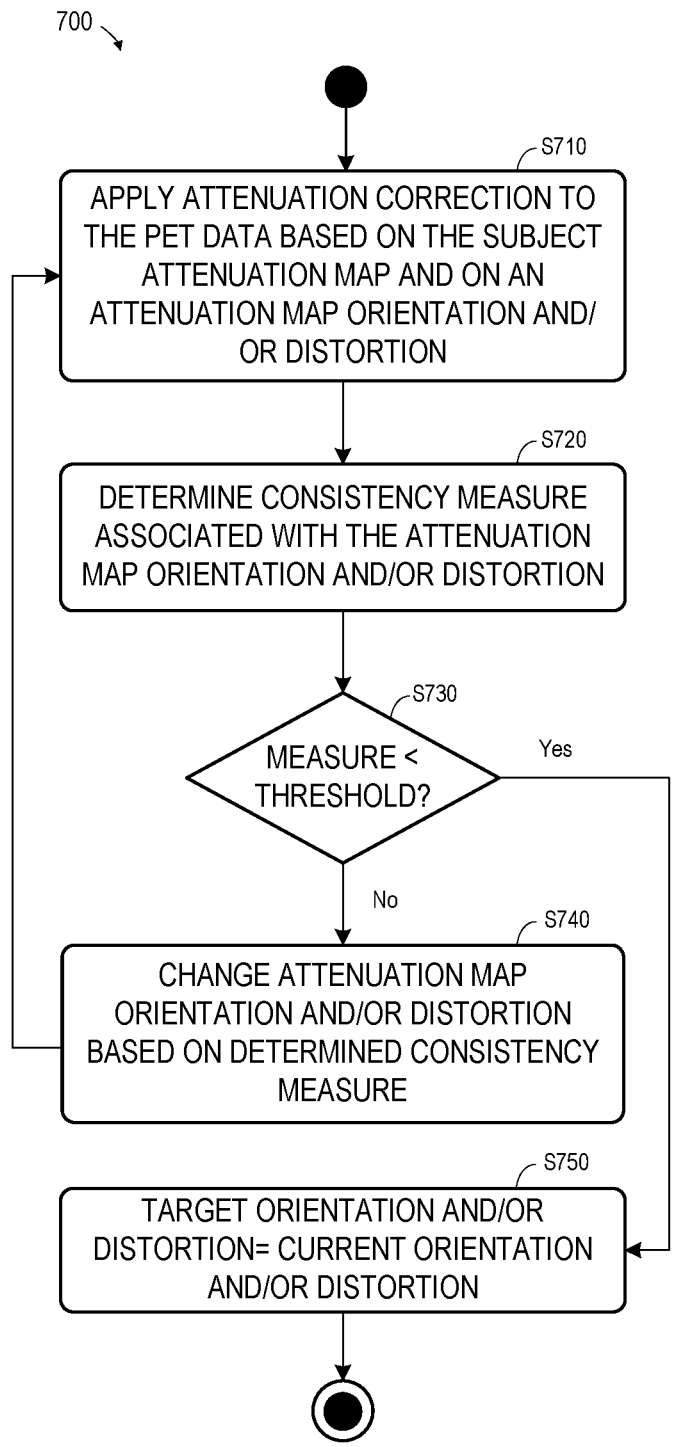
FIG. 7 is a flow diagram of a process to determine a target orientation of attenuation maps according to some embodiments.

FIG. 7 is a flow diagram of process 700 to determine a target orientation and distortion at S250 according to some embodiments. Initially, at S710, attenuation correction is applied to the PET data using the subject attenuation map and the attenuation map(s) associated with the imaging hardware. The attenuation correction is applied based on an initial orientation and/or distortion of the attenuation map(s) with respect to the PET data. The initial orientation and/or distortion may be a default orientation and/or distortion, an orientation and/or distortion detected by one or more optical cameras, or otherwise determined.

A consistency measure is determined at S720 for the attenuation-corrected PET data. The consistency measure may be determined as described above or in any suitable manner. At S730, it is determined whether the consistency measure is less than a predefined threshold. For example, a threshold may be defined which indicates an acceptable level of consistency which indicates that the imaging hardware attenuation correction maps are sufficiently aligned with the PET data.

If the consistency measure is not less than the predefined threshold, the current orientation and/or distortion of the attenuation map(s) is changed at S740. The orientation and/or distortion may be changed based on the consistency measure according to some embodiments. For example, S740 may deploy an algorithm which changes the orientation and/or distortion based on prior-determined consistency measures such that the determined consistency measures approach a minimum during successive iterations of S710 through S740.

Flow returns from S740 to S710 to apply attenuation correction to the original PET data based on the now-current orientation and/or distortion of the attenuation map(s). Flow therefore cycles through S710, S720, S730 and S740 until it is determined at S730 that the consistency measure is less than the threshold and flow proceeds to S750. At S750, the target orientation and/or distortion is determined to be the current target orientation and/or distortion. According to some embodiments, the number of cycles through S710, S720, S730 and S740 may be limited to a maximum number, after which flow proceeds to S750 and the target orientation and/or distortion is determined to be the orientation and/or distortion which was associated with the lowest consistency measure determined at S720.

Figure 8:
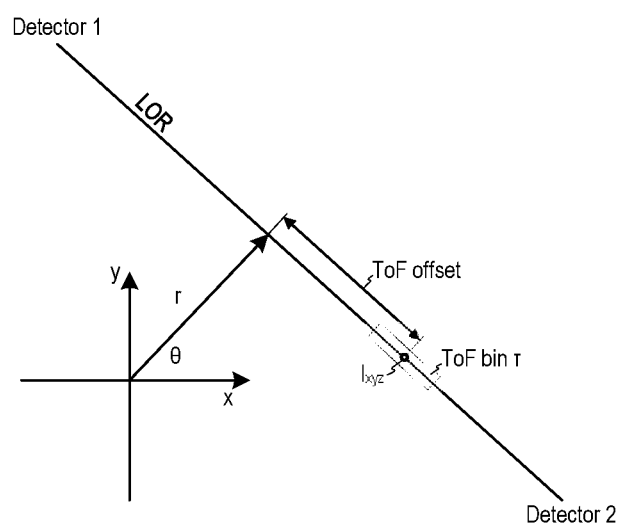
FIG. 8 is a diagram illustrating a Line-of-Response (LOR) and a Time-of-Flight (ToF) bin associated with an annihilation event according to some embodiments.

A mathematical description of S250 now follows with respect to FIG. 8. The determination at S250 may consist of selecting N spatial locations, $l_{xyz}$, that represent point sources. For each view angle θ around a spatial location $l_{xyz}$, radial and TOF bin indices (r, τ) are identified which represent the sinogram bins of LORs which intercept $l_{xyz}$ within the TOF window. For location $l_{xyz}$, sinogram locations at all view angles are calculated to obtain the total coincidence rates corresponding to location $l_{xyz}$, in the PET data sinogram, $$p_l(\theta) \text{ for } \theta \in \left[-\frac{\pi}{2}, \frac{\pi}{2}\right]$$

where, specific to point $l_{xyz}$, r and τ for each view angle θ are functions of θ and determined geometrically as illustrated in FIG. 6.

At each view angle, the total coincidence rate is then corrected for attenuation such that $$p'_l(\theta) = p_l(\theta) * T^* acf_{hw}(\theta) * acf_{subject}(\theta) \text{ for } \theta \in \left[-\frac{\pi}{2}, \frac{\pi}{2}\right]$$

where $acf_{hw}$ and $acf_{subject}$ are the corresponding attenuation correction maps of the hardware and subject, respectively, and T* is the spatial transformation matrix that orients $acf_{hw}$ to achieve optimum consistency. In a case that more than one imaging hardware attenuation correction map was determined at S210, $acf_{hw}$ is the result of multiplication of the one or more maps. Ignoring the effects of scatter and randoms, $p'_l(\theta)$ will be approximately equal for all θ if T* correctly orients $acf_{hw}$. In this regard, a scatter sinogram may be calculated and subtracted from the PET data sinogram prior to the following optimization.

The attenuation correction map of the imaging hardware is correctly oriented when the coefficient of variation at each coordinate is minimized. Considering all N coordinates, the orientation of the hardware attenuation correction map may be determined in some embodiments by minimizing the following cost function:

$$T^* = \min_T \left\{ \frac{1}{N} \sum_{n=1}^{N} \frac{\text{s.d.}(p'_n(\theta))}{\text{mean}(p'_n(\theta))} \right\}$$

Minimization of the cost function may be achieved by exhaustive search of all positioning possibilities, or by conventional heuristic and iterative search methods. As an initial condition, the location of the imaging hardware with respect to the PET frame of reference may be estimated using optical cameras. Transformation matrix T may be explicitly restricted to affine in the case of rigid hardware and include only translations and rotations, or it may be non-rigid in the case of flexible hardware such as an MR body coil. Non-rigid transformations can be constrained to limit possible distortions according to the physical properties of the hardware itself, and in some embodiments this constraint can be described by mathematical models.

The selection of the N coordinates can be performed by equally spacing N points throughout the imaging field of view. Alternatively, only locations in the emission image which exceed a predefined fraction of the maximum count rate may be considered. These locations can be calculated in image space (via an initial approximate reconstruction), or in sinogram coordinates.

Figure 9:
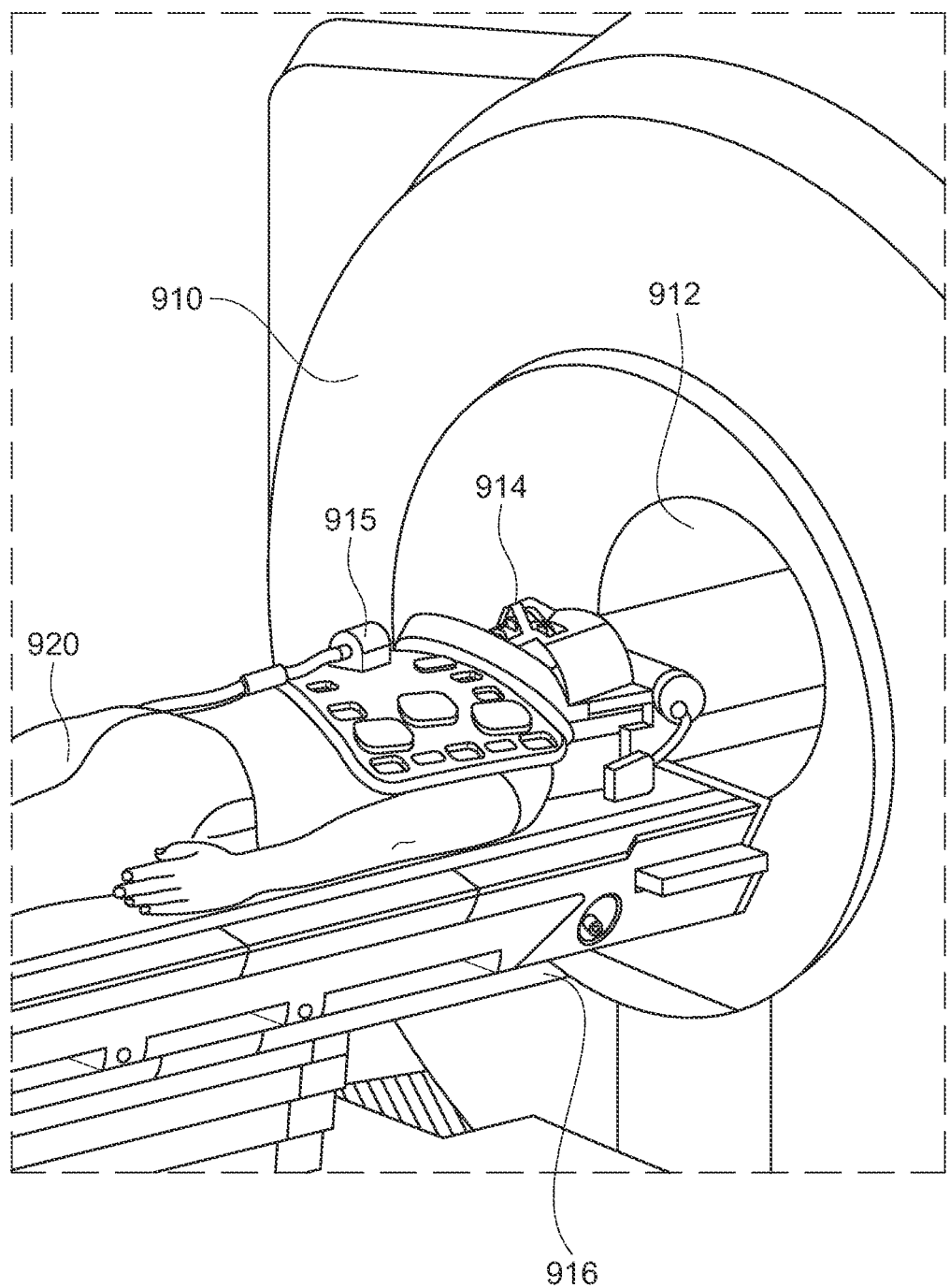
FIG. 9 is a view of a PET/MR system prior to scanning a patient, a head/neck coil and a body coil according to some embodiments.

To illustrate additional scenarios in which embodiments may be implemented, FIG. 9 shows subject 920 prior to being placed into bore 912 of PET/MR system housing 910. MR head/neck coil 914 and MR body coil 915 surround subject 920 and will therefore be disposed in the field of view of a subsequent PET scan. Accordingly, in this example, S210 of process may include determination of an attenuation correction map associated with MR head/neck coil 914 and an attenuation correction map associated with MR body coil 915. Determination of the target orientation and/or distortion at S250 may therefore include determination of a target orientation of rigid MR head/neck coil 914 and a separate target orientation and/or distortion of non-rigid MR body coil 915.

Figure 10:
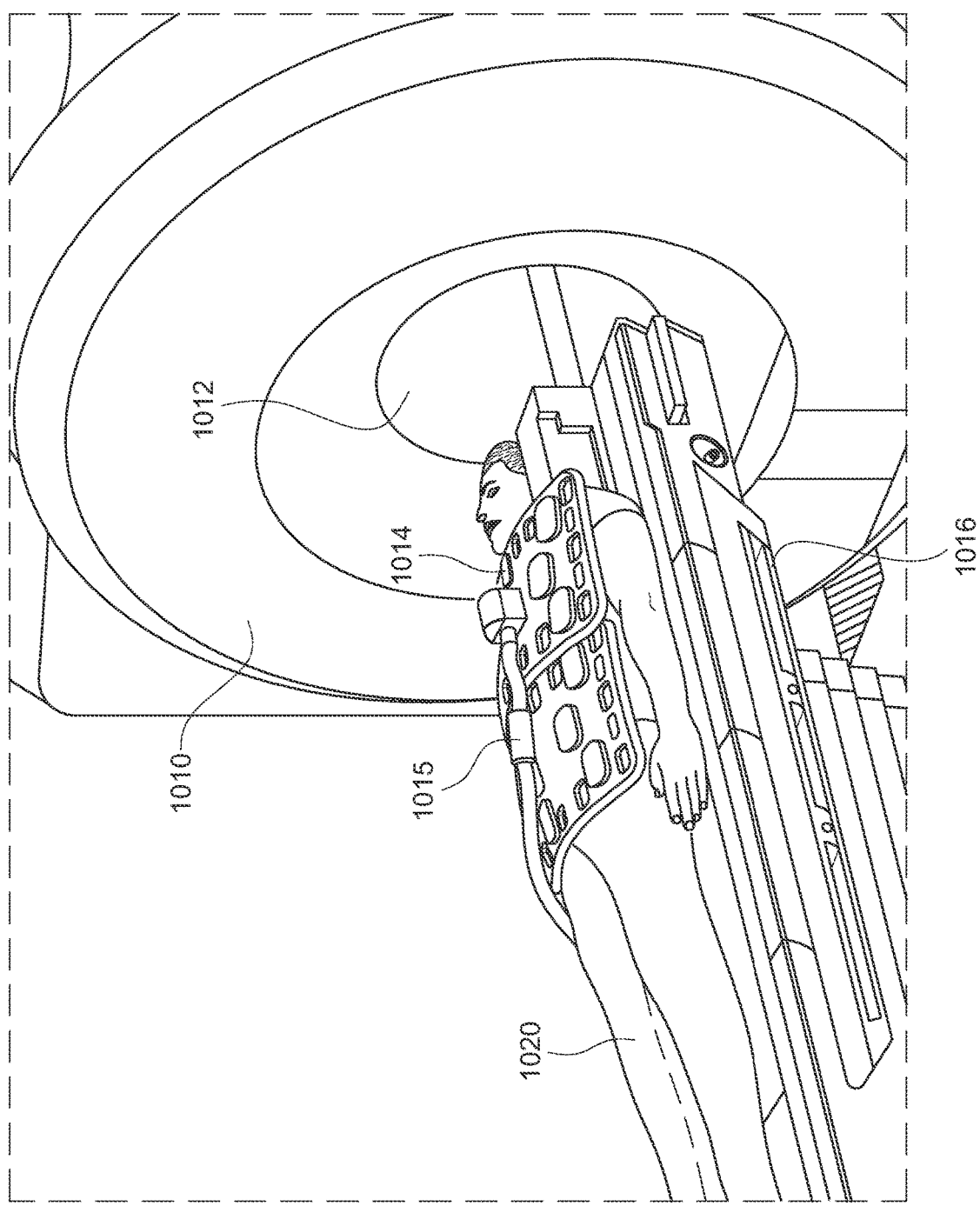
FIG. 10 is a view of a PET/MR system prior to scanning a patient and two body coils according to some embodiments.

FIG. 10 shows subject 1020 prior to being moved into bore 1012 of PET/MR system housing 1010, with MR body coil 1014 and MR body coil 1015 placed thereon. In this example, S210 of process may include determination of an attenuation correction map associated with MR body coil 1014 and an attenuation correction map associated with MR body coil 1015. Determination of the target orientation and/or distortion at S250 may include determination of a target orientation and/or distortion of non-rigid MR body coil 1014 and a separate target orientation and/or distortion of non-rigid MR body coil 1015.

An MR/PET system may similarly execute embodiments to perform attenuation correction on PET data acquired from a PET scan of a phantom. In this regard, generation of an MR-derived attenuation map of a phantom is difficult due to the lack of visibility of the phantom walls to MR imaging. For example, a PET scan of the phantom is executed to acquire PET data of the phantom. A previously-derived (e.g., CT-derived) attenuation correction map of the phantom is acquired and embodiments are executed to determine the orientation of the attenuation correction map that best matches the acquired PET data.

Figure 11:
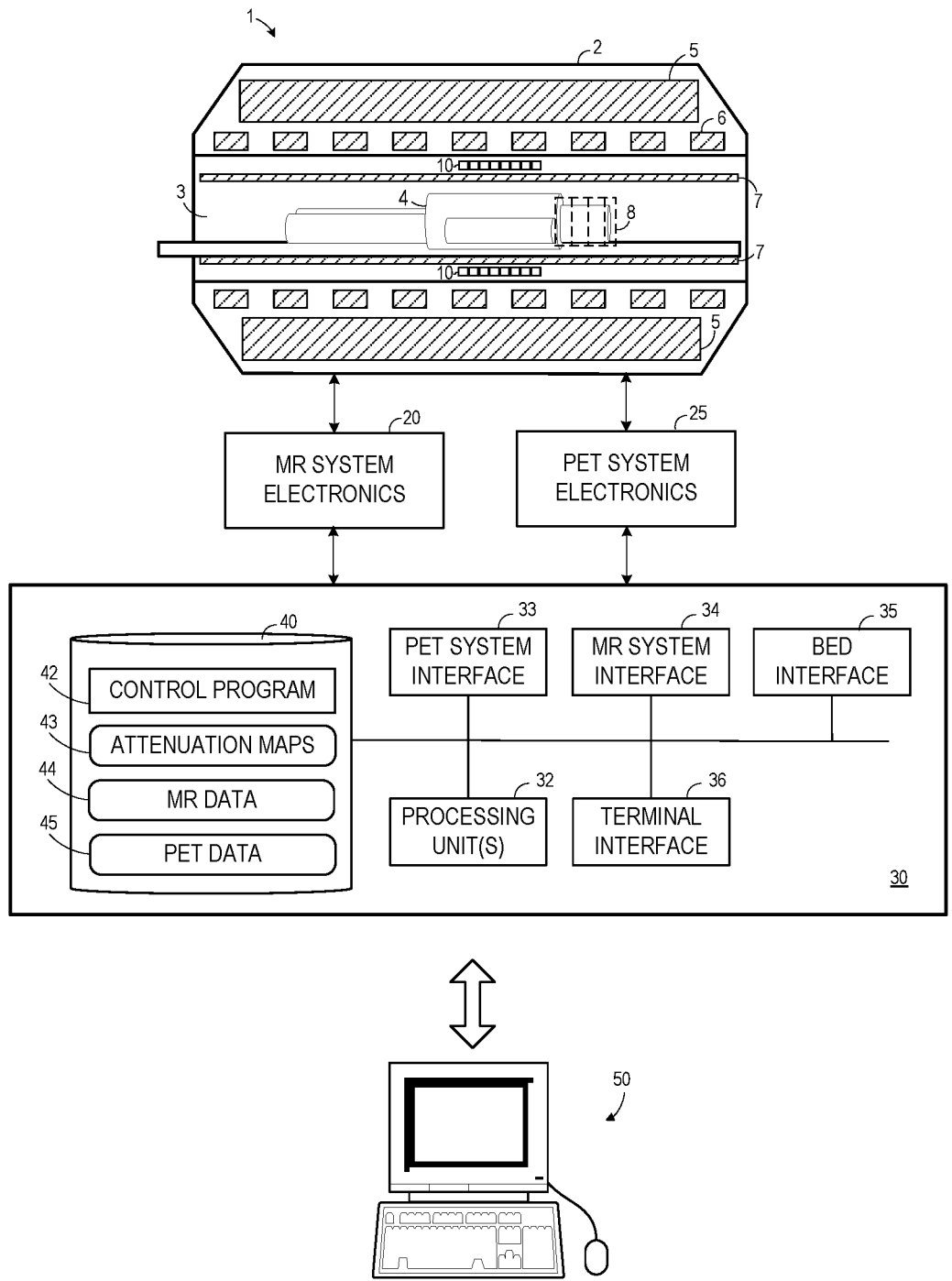
FIG. 11 is a block diagram of a PET/MR imaging system according to some embodiments.

FIG. 11 illustrates MR-PET system 1 for executing MR and PET scans according to some embodiments. System 1 includes chassis 2, which defines bore 3 in which patient 4 is shown disposed. Chassis 2 includes polarizing main magnet 5, gradient coils 6 and RF coil 7 arranged about bore 3. MR head/neck coil 8 is disposed about a head and neck of patient 4 According to some embodiments, polarizing main magnet 5 generates a uniform main magnetic field ($B_0$), gradient coils 6 produce magnetic field gradients $G_x$, $G_y$, and $G_z$ to select particular portions of patient 4 to image, RF coil 7 emits an excitation field ($B_1$), and MR head/neck coil 8 receives signals emitted from patient 4 after removal of the excitation field.

PET detectors 10 comprise a ring of PET detectors disposed between gradient coils 6 and RF coil 7, but embodiments are not limited thereto. In the illustrated embodiment, the ring of PET detectors 10 is eight PET detectors in width. PET detectors 10 may include any number or type of detectors in any configuration as is known in the art. Each detector may include one or more scintillation elements and one or more electrical transducers to generate an electrical signal in response to a received gamma photon.

System 30 controls operation of PET/MR system 1 via MR system electronics 20 and PET system electronics 25. MR system electronics 20 may comprise, for example, sequence controllers, digital-analog converters and power amplifiers to generate gradient pulses and RF pulses according to a desired MR imaging sequence. PET system electronics 25 may comprise electronic components to receive electrical signals generated by detectors 10 and detect coincidences based thereon.

System 30 may comprise any general-purpose or dedicated computing system. System 30 of FIG. 11 includes one or more processing units 32 (e.g., processors, processor cores, execution threads, etc.) configured to execute processor-executable program code to cause system 30 to operate as described herein, and storage device 40 for storing the program code. Storage device 40 may comprise one or more fixed disks, solid-state random-access memory, and/or removable media (e.g., a thumb drive) mounted in a corresponding interface (e.g., a USB port).

Storage device 40 stores program code of control program 42. One or more processing units 32 may execute control program 42 to provide instructions to MR system electronics 20 via MR system interface 34. For example, control program 42 may be executed to instruct MR system electronics 20 to initiate a desired pulse sequence in order to acquire MR data for storage within MR data 44. Control program 42 may also be executed to instruct PET system electronics 25 to acquire PET data 45 representing coincidences acquired by PET detectors 10. Control program 42 may further include processor-executable program code to cause system 30 to perform attenuation correction on acquired PET data based on one or more of imaging hardware attenuation maps 43 and on an attenuation map of patient 4 generated based on MR data 44 as described herein. For example, imaging hardware attenuation maps 43 may include an attenuation map corresponding to MR head/neck coil 8.

Acquired and/or attenuation-corrected PET, MR and combined images may be provided to terminal 50 via terminal interface 36 of system 30. Terminal interface 36 may also receive input from terminal 50, which may be used to provide commands to control program 42 in order to control elements of system 1. The commands may include commands to initiate an imaging sequence to acquire image data of a subject. Terminal 50 may simply comprise a display device and an input device coupled to system 30. In some embodiments, terminal 50 is a separate computing device such as, but not limited to, a desktop computer, a laptop computer, a tablet computer, and a smartphone.

Each component of system 1 and other systems described herein may include other elements which are necessary for the operation thereof, as well as additional elements for providing functions other than those described herein. Each functional component described herein may be implemented in computer hardware, in program code and/or in one or more computing systems executing such program code as is known in the art. Such a computing system may include one or more processing units which execute processor-executable program code stored in a memory system.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
    a magnetic resonance imaging system to execute a magnetic resonance sequence to acquire magnetic resonance data of a subject;
    a positron emission tomography imaging system to acquire positron emission tomography data of the subject and imaging hardware; and
    a processing unit to:
        generate a subject attenuation correction map of the subject based on the magnetic resonance data or the positron emission tomography data of the subject;
        determine an imaging hardware attenuation correction map associated with the imaging hardware;
        determine a target location and orientation of the imaging hardware attenuation correction map with respect to the positron emission tomography data based on the positron emission tomography data and on the subject attenuation correction map; and
        apply attenuation correction to the positron emission tomography data based on the subject attenuation correction map and the imaging hardware attenuation correction map located in the determined target location and oriented in the determined orientation with respect to the positron emission tomography data.

2. The system according to claim 1, wherein application of attenuation correction to the positron emission tomography data comprises reconstruction of a positron emission tomography image from the positron emission tomography data based on the imaging hardware attenuation correction map in the target location and orientation and the subject attenuation correction map.

3. The system according to claim 1, wherein determination of the target location and orientation of the imaging hardware attenuation correction map comprises determination of the target location and orientation and a target distortion of the imaging hardware attenuation correction map with respect to the positron emission tomography data, and
    wherein attenuation correction is applied to the positron emission tomography data based on the imaging hardware attenuation correction map located in the target location, oriented in the determined orientation and distorted by the target distortion with respect to the positron emission tomography data, and the subject attenuation correction map.

4. The system according to claim 1, wherein determination of the target location and orientation of the imaging hardware attenuation correction map based on the positron emission tomography data and on the subject attenuation correction map comprises:
    for each of a plurality of candidate locations and orientations of the imaging hardware attenuation correction map with respect to the positron emission tomography data, application of attenuation correction to the positron emission tomography data based on the candidate location and orientation of the imaging hardware attenuation correction map and on the subject attenuation correction map; and based on the plurality of attenuation-corrected positron emission tomography data, determine the target location and orientation from the plurality of candidate locations and orientations.

5. The system according to claim 4, wherein determination of the target location and orientation from the plurality of candidate locations and orientations comprises:

determination of a consistency measure associated with each of the plurality of attenuation-corrected positron emission tomography data; and determination of one of the plurality of candidate locations and orientations associated with attenuation-corrected positron emission tomography data having an optimal consistency measure.

6. The system according to claim 1, the processing unit further to:

determine a second imaging hardware attenuation correction map associated with the imaging hardware, wherein determination of the target location and orientation of the imaging hardware attenuation correction map with the respect to the positron emission tomography data comprises determination of the target location and orientation of the imaging hardware attenuation correction map and determination of a second target location and second orientation of the second imaging hardware attenuation correction map with the respect to the positron emission tomography data based on the positron emission tomography data and on the subject attenuation correction map, and wherein attenuation correction is applied to the positron emission tomography data based on the imaging hardware attenuation correction map located in the target location and oriented in the determined orientation with the respect to the positron emission tomography data, the second imaging hardware attenuation correction map located in the second target location and oriented in the determined second orientation with the respect to the positron emission tomography data, and the subject attenuation correction map.

7. The system according to claim 6, wherein determination of the target location and orientation of the imaging hardware attenuation correction map and determination of a second target location and second orientation of the second imaging hardware attenuation correction map based on the positron emission tomography data and on the subject attenuation correction map comprises:

for each of a plurality of candidate locations and orientations of the imaging hardware attenuation correction map and of the second imaging hardware attenuation correction map, application of attenuation correction to the positron emission tomography data based on the candidate location and orientation of the imaging hardware attenuation correction map and the second imaging hardware attenuation correction map, and on the subject attenuation correction map; and based on the plurality of attenuation-corrected positron emission tomography data, determine the target location and orientation and the second target location and second orientation from the plurality of candidate locations and orientations.

8. A method comprising:

acquiring magnetic resonance data of a subject disposed in a first position;

acquiring positron emission tomography data of imaging hardware and of the subject disposed substantially in the first position;

generating a subject attenuation correction map of the subject based on the magnetic resonance data;

determining an imaging hardware attenuation correction map associated with the imaging hardware;

determining a target location and orientation of the imaging hardware attenuation correction map with respect to the positron emission tomography data and based on the positron emission tomography data and on the subject attenuation correction map; and applying attenuation correction to the positron emission tomography data based on the subject attenuation correction map and the imaging hardware attenuation correction map located in the target location and oriented in the determined orientation with the respect to the positron emission tomography data to generate attenuation-corrected positron emission tomography data.

9. The method according to claim 8, wherein applying attenuation correction to the positron emission tomography data comprises reconstructing a positron emission tomography image from the positron emission tomography data based on the subject attenuation correction map and on the imaging hardware attenuation correction map located in the target location and oriented in the determined orientation with the respect to the positron emission tomography data.

10. The method according to claim 8, wherein determining the target location and orientation of the imaging hardware attenuation correction map comprises determining the target location and orientation and a target distortion of the imaging hardware attenuation correction map, and wherein attenuation correction is applied to the positron emission tomography data based on the subject attenuation correction map and on the imaging hardware attenuation correction map located in the target location, oriented in the determined orientation and the distorted by the target distortion with the respect to the positron emission tomography data.

11. The method according to claim 8, wherein determining the target location and orientation of the imaging hardware attenuation correction map based on the positron emission tomography data and on the subject attenuation correction map comprises:

for each of a plurality of candidate locations and orientations of the imaging hardware attenuation correction map, applying attenuation correction to the positron emission tomography data based on the candidate location and orientation of the imaging hardware attenuation correction map and on the subject attenuation correction map; and based on the plurality of attenuation-corrected positron emission tomography data, determining the target location and orientation from the plurality of candidate locations and orientations.

12. The method according to claim 11, wherein determining the target location and orientation from the plurality of candidate locations and orientations comprises:

determining a consistency measure associated with each of the plurality of attenuation-corrected positron emission tomography data; and determining one of the plurality of candidate locations and orientations associated with attenuation-corrected positron emission tomography data having an optimal consistency measure.

13. The method according to claim 8, further comprising:
determining a second imaging hardware attenuation correction map associated with the imaging hardware,
wherein determining the target location and orientation of the imaging hardware attenuation correction map comprises determining the target location and orientation of the imaging hardware attenuation correction map and determination of a second target location and second orientation of the second imaging hardware attenuation correction map based on the positron emission tomography data and on the subject attenuation correction map, and
wherein attenuation correction is applied to the positron emission tomography data based on the imaging hardware attenuation correction map located in the target location and oriented in the determined orientation, the second imaging hardware attenuation correction map located in the second target location and oriented in the determined second orientation, and the subject attenuation correction map.

14. The method according to claim 13, wherein determining the target location and orientation of the imaging hardware attenuation correction map and determination of a second target location and second orientation of the second imaging hardware attenuation correction map based on the positron emission tomography data and on the subject attenuation correction map comprises:
for each of a plurality of candidate locations and orientations of the imaging hardware attenuation correction map and of the second imaging hardware attenuation correction map, applying attenuation correction to the positron emission tomography data based on the candidate location and orientation of the imaging hardware attenuation correction map and the second imaging hardware attenuation correction map, and on the subject attenuation correction map; and
based on the plurality of attenuation-corrected positron emission tomography data, determining the target location and orientation and the second target location and second orientation from the plurality of candidate locations and orientations.

15. A non-transitory or computer-readable medium storing processor-executable program code executable by a processing unit to cause a system to:
acquire magnetic resonance data of a subject disposed in a first position;
acquire positron emission tomography data of imaging hardware and of the subject disposed substantially in the first position;
generate a subject attenuation correction map of the subject based on the magnetic resonance data;
determine an imaging hardware attenuation correction map associated with the imaging hardware;
determine a target location and orientation of the imaging hardware attenuation correction map with respect to the positron emission tomography data and based on the positron emission tomography data and on the subject attenuation correction map; and
apply attenuation correction to the positron emission tomography data based on the subject attenuation correction map and the imaging hardware attenuation correction map located in the target location and oriented in the determined orientation with the respect to the positron emission tomography data to generate attenuation-corrected positron emission tomography data.

16. The non-transitory computer-readable medium according to claim 15, wherein
determination of the target location and orientation of the imaging hardware attenuation correction map comprises determining the target location and orientation and a target distortion of the imaging hardware attenuation correction map, and
wherein attenuation correction is applied to the positron emission tomography data based on the imaging hardware attenuation correction map in the target location, oriented in the determined orientation and distorted by the target distortion with the respect to the positron emission tomography data, and the subject attenuation correction map.

17. The non-transitory computer-readable medium according to claim 15, wherein determination of the target location and orientation of the imaging hardware attenuation correction map based on the positron emission tomography data and on the subject attenuation correction map comprises:
for each of a plurality of candidate locations and orientations of the imaging hardware attenuation correction map, application of attenuation correction to the positron emission tomography data based on the candidate location and orientation of the imaging hardware attenuation correction map and on the subject attenuation correction map;
determination of a consistency measure associated with each of the plurality of attenuation-corrected positron emission tomography data; and
determination of one of the plurality of candidate locations and orientations associated with attenuation-corrected positron emission tomography data having an optimal consistency measure.

18. The non-transitory computer-readable medium according to claim 15, the processor-executable program code further executable by a processing unit to cause a system to:
determine a second imaging hardware attenuation correction map associated with the imaging hardware,
wherein determination of the target location and orientation of the imaging hardware attenuation correction map comprises determining the target location and orientation of the imaging hardware attenuation correction map and determination of a second target location and second orientation of the second imaging hardware attenuation correction map based on the positron emission tomography data and on the subject attenuation correction map, and
wherein attenuation correction is applied to the positron emission tomography data based on the imaging hardware attenuation correction map located in the target location and oriented in the determined orientation with the respect to the positron emission tomography data, the second imaging hardware attenuation correction map located in the second target location and oriented in the determined second orientation with the respect to the positron emission tomography data, and the subject attenuation correction map.

19. The non-transitory computer-readable medium according to claim 18, wherein determination of the target location and orientation of the imaging hardware attenuation correction map and determination of a second target location and second orientation of the second imaging hardware attenuation correction map based on the positron emission tomography data and on the subject attenuation correction map comprises:

for each of a plurality of candidate locations and orientations of the imaging hardware attenuation correction map and of the second imaging hardware attenuation correction map, application of attenuation correction to the positron emission tomography data based on the candidate location and orientation of the imaging hardware attenuation correction map and the second imaging hardware attenuation correction map, and on the subject attenuation correction map; and based on the plurality of attenuation-corrected positron emission tomography data, determination of the target location and orientation and the second target location and second orientation from the plurality of candidate locations and orientations.

20. The non-transitory computer-readable medium according to claim 15, wherein application of attenuation correction to the positron emission tomography data comprises reconstruction of a positron emission tomography image from the positron emission tomography data based on the imaging hardware attenuation correction map located in the target location and oriented in the determined second orientation with the respect to the positron emission tomography data, and the subject attenuation correction map.

* * * * *